Aug. 7, 1934.    L. O. BIRD    1,969,684
RIPPER
Filed Dec. 7, 1932

L. O. Bird, Inventor

Patented Aug. 7, 1934

1,969,684

UNITED STATES PATENT OFFICE 1,969,684

RIPPER

Len O. Bird, Glendale, Calif., assignor to W. L. Adams, Rexburg, Idaho

Application December 7, 1932, Serial No. 646,101

3 Claims. (Cl. 97—233)

This invention relates to ground ripping means and has for its particular object the provision of a ripping device in which the frame structure is adapted to support the various scarifying, plowing, cultivating or subsoiling tools in any staggered, parallel, aligned or other suitable relation, according to the nature of work to be done, and in which the changing of the tools or their relative grouping may be done quickly and conveniently.

It also has for its object the provision of such a fabricated frame structure wherein by using a minimum amount of material the factor of rigidity has been considerably increased, thereby making the device as a whole more efficient.

Another object is the provision of such a frame structure which will permit the wheels upon which the device rolls to be located within said frame structure to enable the earth working tools at the sides of the frame to prepare ground at the base of embankments or terraces.

Still another object is the provision of a new and novel type of wheel frame wherein the axle of each wheel is supported rigidly at both ends, thereby, together with an extremely simple actuating mechanism permitting the use of the implement under extremely severe operating conditions with a minimum of torsional, bending and other deforming strains tending to distort the wheel frame and consequently the alignment of the wheels or impair the efficiency of the actuating mechanism.

As a further object, it provides a simple and compact yet substantial power controlled implement by which the ground surface may be operated upon to a desired degree of depth and that this depth together with the operative and inoperative positions of the device may be controlled efficiently with a minimum of power by a single operator at a remote station.

With these and other objects in view the invention consists in the combination, correlation and construction of parts, members and features which will be described in the specification and will be finally pointed out in the claims.

Referring to the drawing.

Figure 1:
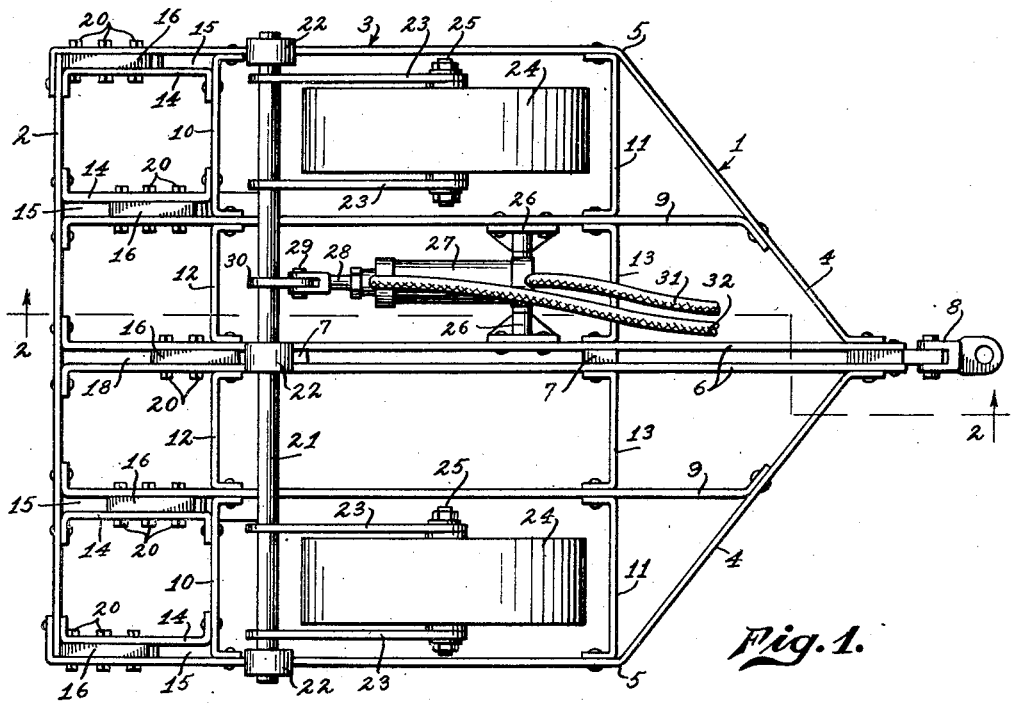
Figure 1 is a plan view of a device embodying my invention.

The frame 1 consists of a rear cross bar 2 having secured at its ends the side bars 3 which are parallel for part of their length and converging forwardly as at 4 from a point 5 to the forward ends of the centrally located parallel bars 6. The parallel bars 6 are secured at their rear ends to cross bar 2 and have at points intermediate their ends the spacing members 7 and disposed between their forward ends the means 8 for connecting the device to any source of motive power. Longitudinal reinforcing bars 9 are disposed between the side bars 3 and the parallel bars 6 and secured at the ends to cross bar 2 and converging members 4. Transversely reinforcing the frame 1 at a point just forward of the cross bar 2 and at the converging point 5 are cross members 10 and 11 between side bars 3 and longitudinal bars 9, and cross members 12 and 13 between the reinforcing bars 9 and parallel bars 6. At the rear of the frame 1 and interposed between cross bar 2 and cross members 10 and spaced from side bars 3 and longitudinal members 9 are the bars 14 forming the elongated pockets 15 for reception of shanks 16 of the earth working tools 17. The central pocket 18 is formed by the spacing of the parallel bars 6. A multiplicity of holes 19 in the members forming the side walls of the pockets 15 and 18 permit a range of longitudinal positions in which the earth working tools may be secured by means of the bolts 20.

The transverse shaft 21 journaled in bearings 22 mounted on the frame 1 has near its ends and fixed thereto forwardly extending arms 23. The arms 23 are arranged in pairs and spaced to receive the wheels 24 and support the ends of axles 25 on both sides of the wheels 24.

Interposed between one longitudinal member 9 and one of the parallel bars 6 and mounted pivotally in bearings 26 is a hydraulic power unit 27 having its piston rod 28 pivotally secured at 29 to the actuating lever 30 fixed on the shaft 21.

Figure 2:
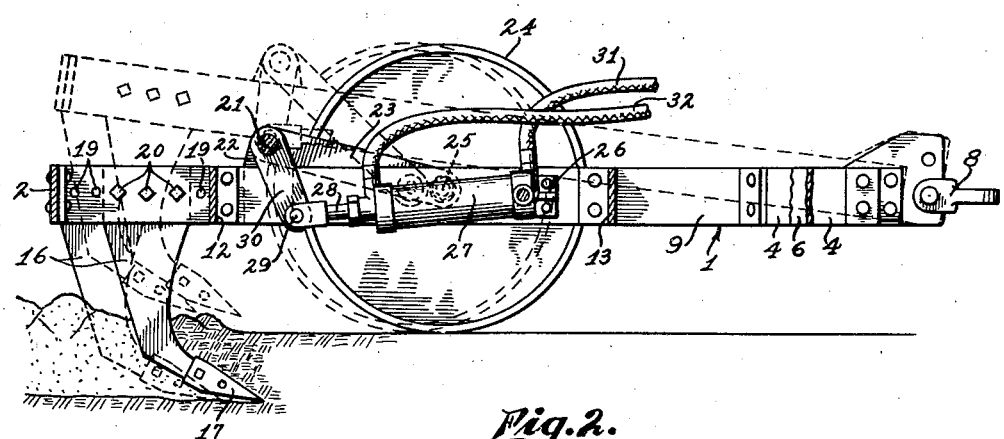
Figure 2 is a section taken on line 2—2 of Figure 1 illustrating the different positions the device may be caused to assume.

In practice, the lowering and raising of the ripping device is controlled by a conventional system of valves (not shown) near the operator's seat in the tractor which governs the supply of fluid under pressure to the hydraulic unit 27 through the hose conduits 31 and 32 from a pump also conventionally mounted on and driven by the tractor engine. This hydraulic power unit imparts an oscillating motion to the transverse shaft 21 through the actuating lever 30 thereby, by virtue of the fixed arms 23 raising and lowering the frame 1 with respect to the wheels 24. In Figure 2 the ripping device is shown in one of the operative positions and by the dotted lines in the inoperative position.

Having thus described my invention I claim:

1. In a ripper of the character disclosed, a series of longitudinal members and a multiplicity of transverse members conjoined and fabricated to form a rectangular frame structure having a forwardly extending triangular portion, means for connection to a tractor at the apex of said triangular portion, a series of longitudinal spacers conjoined with said transverse members, means for supporting earth working tools in selective orders between said longitudinal spacers and members, a transverse shaft having near each end a pair of wheeled arms pivotally mounted on said frame structure, means for oscillating said shaft to raise and lower said frame with respect to the wheels.

2. In a ripper of the character disclosed, a fabricated frame structure comprising a series of longitudinal and transverse members conjoined to form a rectangle having a forwardly extending triangular portion, transverse spacers between said longitudinal members near the ends of said frame, longitudinal spacers between said transverse spacers and the rear transverse member, earth working tools having a longitudinal selectivity of positions supported between said longitudinal spacers and members, means for connection to a tractor at the apex of said triangular portion, a transverse shaft having near each end a pair of wheeled arms pivotally mounted on said frame structure, means for oscillating said shaft to raise and lower said frame with respect to the wheels.

3. In a ripper of the character disclosed, a fabricated frame structure comprising a pair of centrally disposed spaced apart longitudinal members, longitudinal side members having their rear portions parallel to said spaced apart members and forward portions inclined at an angle toward the forward end of said spaced apart members, a longitudinal member between each of said side members and said spaced apart members, a transverse member conjoining the rear ends of all said longitudinal members, transverse spacers between said longitudinal members near the forward and rearward ends thereof, longitudinal spacers between said transverse member and spacers at the rear end of said frame, earth working tools having a longitudinal selectivity of positions supported between said longitudinal spacers and members, means at the forward end of said frame for connection to a tractor, a transverse shaft having near each end a pair of wheeled arms pivotally mounted on said frame structure, means for oscillating said shaft to raise and lower said frame with respect to the wheels.

LEN O. BIRD.